(12) United States Patent
Roberge

(10) Patent No.: US 10,287,976 B2
(45) Date of Patent: May 14, 2019

(54) SPLIT GEAR SYSTEM FOR A GAS TURBINE ENGINE

(71) Applicant: United Technologies Corporation, Hartford, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1093 days.

(21) Appl. No.: 14/797,250

(22) Filed: Jul. 13, 2015

(65) Prior Publication Data

US 2016/0195011 A1 Jul. 7, 2016

Related U.S. Application Data

(60) Provisional application No. 62/024,601, filed on Jul. 15, 2014.

(51) Int. Cl.

| F02C 3/107 | (2006.01) |
|---|---|
| F02K 3/06 | (2006.01) |
| F02C 3/113 | (2006.01) |
| F02C 7/36 | (2006.01) |
| F01D 5/06 | (2006.01) |
| F01D 25/24 | (2006.01) |

(Continued)

(52) U.S. Cl.
CPC ............... *F02C 3/107* (2013.01); *F01D 5/06* (2013.01); *F01D 25/24* (2013.01); *F02C 3/113* (2013.01); *F02C 7/36* (2013.01); *F02K 3/06* (2013.01); *F04D 29/321* (2013.01); *F04D 29/325* (2013.01); *F02K 3/04* (2013.01); *F05D 2220/32* (2013.01); *F05D 2240/35* (2013.01); *F05D 2240/60* (2013.01); *F05D 2260/40* (2013.01); *F05D 2260/40311* (2013.01)

(58) Field of Classification Search
CPC .. F02C 3/107; F02C 3/113; F02C 7/36; F02K 3/04; F02K 3/06; F05D 2260/40; F05D 2260/403; F05D 2260/4031; F05D 2260/40311
See application file for complete search history.

(56) References Cited

U.S. PATENT DOCUMENTS

| 5,010,729 A | * | 4/1991 | Adamson ................ F02C 3/067 416/129 |
|---|---|---|---|
| 5,809,772 A | | 9/1998 | Giffin, III et al. |
| 6,711,887 B2 | | 3/2004 | Orlando et al. |

(Continued)

OTHER PUBLICATIONS

Extended European Search Report for Application No. 15176920.5 dated Nov. 25, 2015.

*Primary Examiner* — Gerald L Sung
*Assistant Examiner* — Marc Amar
(74) *Attorney, Agent, or Firm* — Carlson, Gaskey & Olds, P.C.

(57) ABSTRACT

A gas turbine engine includes a fan section, a compressor section aft of the fan section, a combustor fluidly connected to the compressor section, and a turbine section fluidly connected to the combustor. The turbine section includes at least a first turbine and a second turbine. The second turbine operates at a higher pressure than the first turbine. A shaft is connected to the first turbine section such that the first turbine section is operable to drive rotation of the shaft. The shaft is a rotational input for a split gear and the split gear is connected to the fan and at least one of the multiple compressors.

4 Claims, 4 Drawing Sheets

(51) Int. Cl.
*F04D 29/32* (2006.01)
*F02K 3/04* (2006.01)

(56) References Cited

U.S. PATENT DOCUMENTS

| | | | | |
|---|---|---|---|---|
| 7,246,484 | B2 | 7/2007 | Giffin, III et al. | |
| 9,021,778 | B2 * | 5/2015 | Kupratis | F02C 7/36 60/39.162 |
| 2008/0060341 | A1 | 3/2008 | Loisy | |
| 2013/0192200 | A1 * | 8/2013 | Kupratis | F02K 3/072 60/226.3 |
| 2013/0192258 | A1 * | 8/2013 | Kupratis | F02C 3/113 60/801 |
| 2013/0192265 | A1 * | 8/2013 | Schwarz | F02K 3/06 60/805 |
| 2013/0223986 | A1 * | 8/2013 | Kupratis | F02C 7/36 415/115 |
| 2013/0224003 | A1 * | 8/2013 | Kupratis | F02K 3/072 415/185 |
| 2013/0259651 | A1 * | 10/2013 | Kupratis | F02C 3/113 415/122.1 |
| 2013/0259652 | A1 * | 10/2013 | Kupratis | F02C 7/36 415/122.1 |
| 2013/0259654 | A1 * | 10/2013 | Kupratis | F02C 7/36 415/122.1 |
| 2015/0354502 | A1 * | 12/2015 | Kuhne | F02K 3/06 60/226.1 |
| 2015/0377144 | A1 * | 12/2015 | Roberge | F02C 7/36 415/1 |
| 2016/0195096 | A1 * | 7/2016 | Otto | F02K 3/06 415/1 |

* cited by examiner

SPLIT GEAR SYSTEM FOR A GAS TURBINE ENGINE

CROSS-REFERENCE TO RELATED APPLICATION

This application claims priority to U.S. Provisional Application No. 62/024,601 filed Jul. 15, 2014.

TECHNICAL FIELD

The present disclosure relates generally to geared turbofan engines, and more specifically to a split gear system for a geared turbofan engine.

BACKGROUND

Gas turbine engines utilize a compressor section to compress input air. The compressor section provides the compressed air to a combustor. The combustor ignites a mixture of the compressed air and fuel. The resultant combustion gasses are expelled from the combustor into a turbine section. The expansion of the combustion gasses through the turbine section drives multiple stages in the turbine section to rotate. The stages within the turbine section are each connected to at least one shaft, and drive the shaft to rotate along with the turbine section.

The rotation of the shaft is, in turn, utilized to drive the rotation of the compressor section. In a geared turbofan example, the rotation of the shaft further drives rotation of a fan, with the fan being disposed fore of the compressor section and providing air to a primary flowpath through the compressor section, the combustor, and the turbine sections and to a bypass flowpath that bypasses the compressor section, combustor and turbine section. A gear allows the shaft to drive the compressor section at a first speed and the fan at a second speed.

Developments in turbine engine design and component materials allow previously low speed turbine portions, relative to a remainder of the turbine, to have substantially increased rotational speeds. As the turbine rotation is utilized to drive the compressor systems, the increased speed of the lower speed turbine causes an increased rotational speed of the compressors, absent further modifications to a standard engine design.

SUMMARY OF THE INVENTION

In one exemplary embodiment of the disclosure, a gas turbine engine includes a fan section including a fan, a compressor section aft of the fan section, and including multiple compressors, a combustor fluidly connected to the compressor section, a turbine section fluidly connected to the combustor, wherein the turbine section includes at least a first turbine and a second turbine, wherein the second turbine operates at a higher pressure than the first turbine, a shaft connected to the first turbine section such that the first turbine is operable to drive rotation of the shaft, wherein the shaft is a rotational input for a split gear, and wherein the split gear is connected to the fan and at least one of the multiple compressors such that a first output of the split gear drives the fan and a second output of the split gear drives the at least one of the multiple compressors.

In another example of the above described gas turbine engine, the split gear includes at least a first gear set having a rotational input and a rotational output and a second gear set having a rotational input and a rotational output, and wherein each of the rotational outputs is a split gear output.

In another example of any of the above described gas turbine engines, a rotational input of the first gear set is connected to the shaft, such that the first gear set is driven by the shaft.

In another example of any of the above described gas turbine engines, the rotational output of the first gear set is connected to one of the multiple compressors, such that the rotational output of the first gear set is operable to drive rotation of the one of the multiple compressors.

In another example of any of the above described gas turbine engines, the rotational input of the second gear set is connected to the one of the multiple compressors such that rotation of the one of the multiple compressors drives rotation of the second gear set, and wherein the rotational output of the second gear set is connected to the fan such that the rotational output of the second gear set is operable to drive the fan.

In another example of any of the above described gas turbine engines, each of the first gear set and the second gear set is a step down gear set.

In another example of any of the above described gas turbine engines, an output speed of the first gear set is lower than an input speed of the first gear set, and wherein an output speed of the second gear set is lower than an input speed of the second gear set.

In another example of any of the above described gas turbine engines, the compressor section includes a first compressor having a first compressor and a second compressor, wherein the first compressor is at a low pressure relative to the second compressor, and wherein the first compressor comprises a low speed compressor portion and a high speed compressor portion, wherein the shaft is directly connected to the high speed compressor portion and directly drives the high speed compressor portion, wherein the rotational output of the first gear set is connected to the low speed compressor portion, such that the rotational output of the first gear set is operable to drive rotation of the low speed compressor portion, wherein the rotational input of the second gear set is connected to the low speed compressor portion such that rotation of the low speed compressor portion drives rotation of the second gear set, and wherein the rotational output of the second gear set is connected to the fan, such that the rotational output of the second gear set is operable to drive rotation of the fan.

In another example of any of the above described gas turbine engines, a fluid output of the low speed compressor portion is fluidly connected to a fluid input of the high speed compressor portion via a transition duct.

Another example of any of the above described gas turbine engines includes at least one static structural support disposed in the transition duct, wherein the static structural support supports an outer case of the gas turbine engine.

In another example of any of the above described gas turbine engines, wherein a rotational input of the second gear set is connected to the shaft, such that the second gear set is driven by the shaft, wherein the rotational output of the first gear set is connected to the at least one of the multiple compressors such that the rotational output of the first gear set is operable to drive rotation of the at least one of the multiple compressors, wherein a rotational output of the second gear set is connected the fan, such that the rotational output of the second gear set is operable to drive rotation of the fan, and wherein the rotational output speed of the first gear set is higher than the rotational input speed of the first gear set, and the rotational output speed of the second gear set is lower than the rotational input speed of the second gear set.

In another example of any of the above described gas turbine engines, the first turbine section includes a number of stages in the range of 3 to 5 stages.

An exemplary method for driving a compressor section and a fan in a gas turbine engine according to this disclosure includes rotationally driving a shaft using a turbine section, rotationally driving a split gear using the shaft, rotationally driving a compressor using a first output of the split gear, and rotationally driving a fan using a second output of the split gear.

A further example of the above method includes rotationally driving a split gear using the shaft comprises directly driving a first set of gears in the split gear using the shaft, driving the compressor using a first output of the split gear, and driving a second set of gears in the split gear using the compressor.

In a further example of any of the above described methods, rotationally driving a compressor using a first output of the split gear comprises rotationally driving a first compressor portion using the first output of the split gear, and rotationally driving a second compressor portion using a direct connection to the shaft.

In a further example of any of the above described methods, rotationally driving the split gear using the shaft comprises rotationally driving a first gear set and a second gear set using the shaft, and wherein the first output of the split gear is an output of the first gear set and the second output of the split gear is an output of the second gear set.

In a further example of any of the above described methods, rotational first output of the split gear is a faster rotational speed than the input, and wherein a rotational output of the second gear set is a slower rotational speed than the input.

An exemplary split gear for a geared turbofan gas turbine engine includes a first gear set including a first rotational input and a first rotational output, wherein the first gear set is operable to receive a rotational input from a shaft, a second gear set including a second rotational input and a second rotational output, wherein the second gear set is operable to receive rotational input from one of a compressor connected to the rotational output of the first gear set and the shaft, and wherein the second gear set is operable to rotationally drive a fan.

In another example of the split gear for a geared turbofan engine describe above, an output of the first gear set has a slower rotational speed than an input of the first gear set, and wherein an output of the second gear set has a slower rotational speed than an input of the second gear set.

In another example of any of the split gears for a geared turbofan engine describe above, an output of the first gear set has a faster rotational speed than an input of the first gear set, and wherein an output of the second gear set has a slower rotational speed than an input of the second gear set.

These and other features of the present invention can be best understood from the following specification and drawings, the following of which is a brief description.

DETAILED DESCRIPTION OF AN EMBODIMENT

Figure 1:
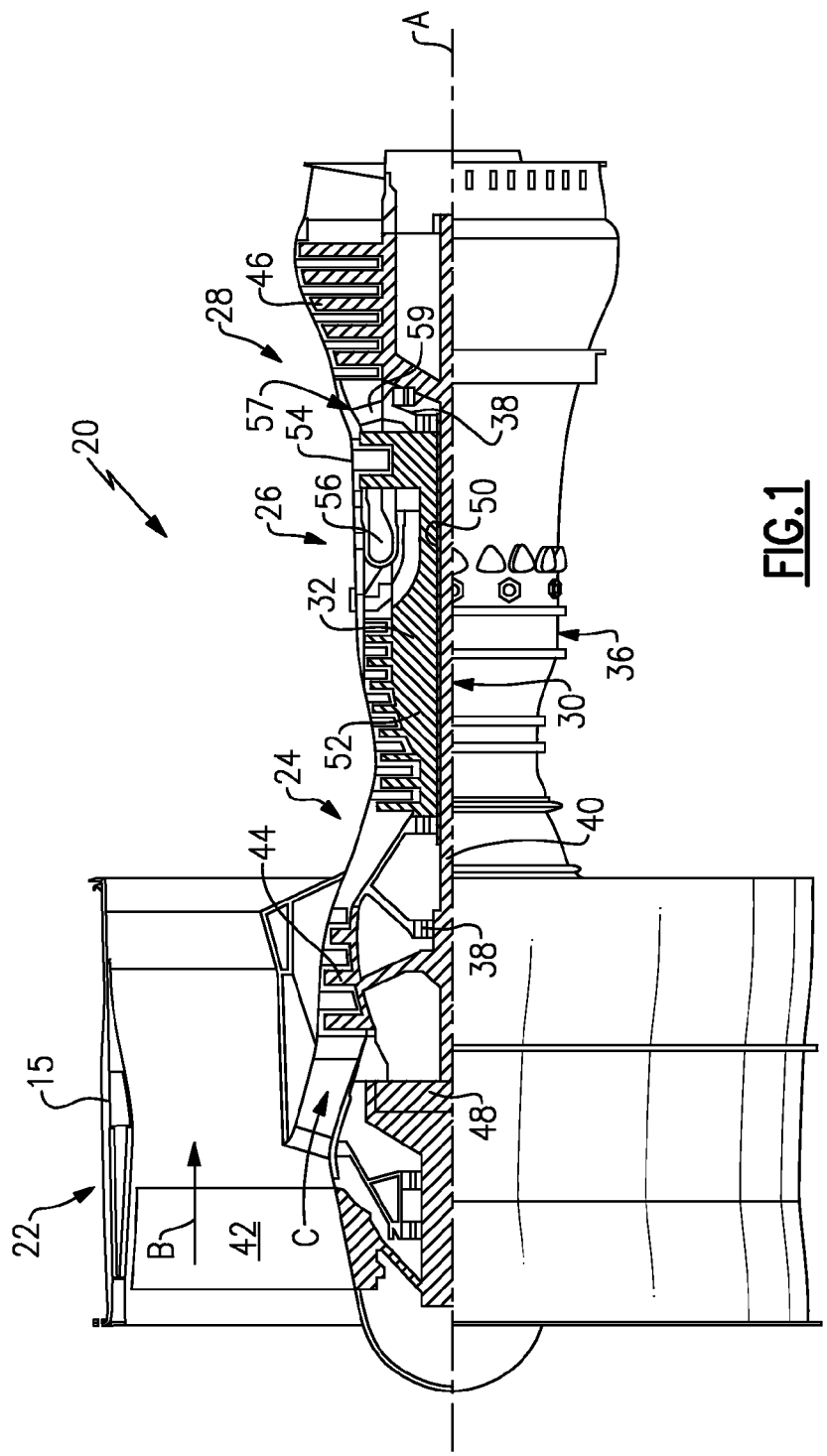
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Figure 2:
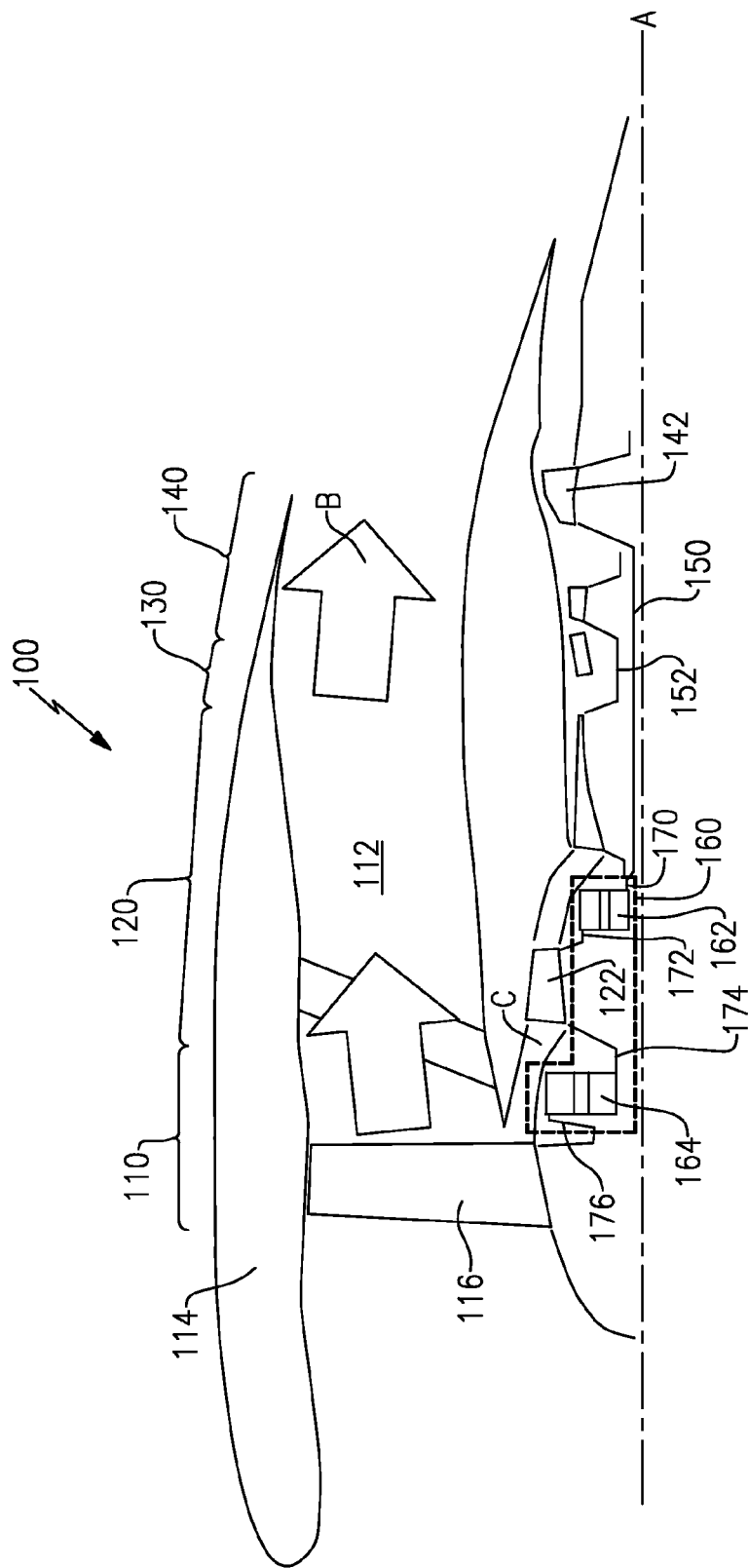
FIG. 2 schematically illustrates a first example geared turbofan engine utilizing a split gear.
Figure 3:
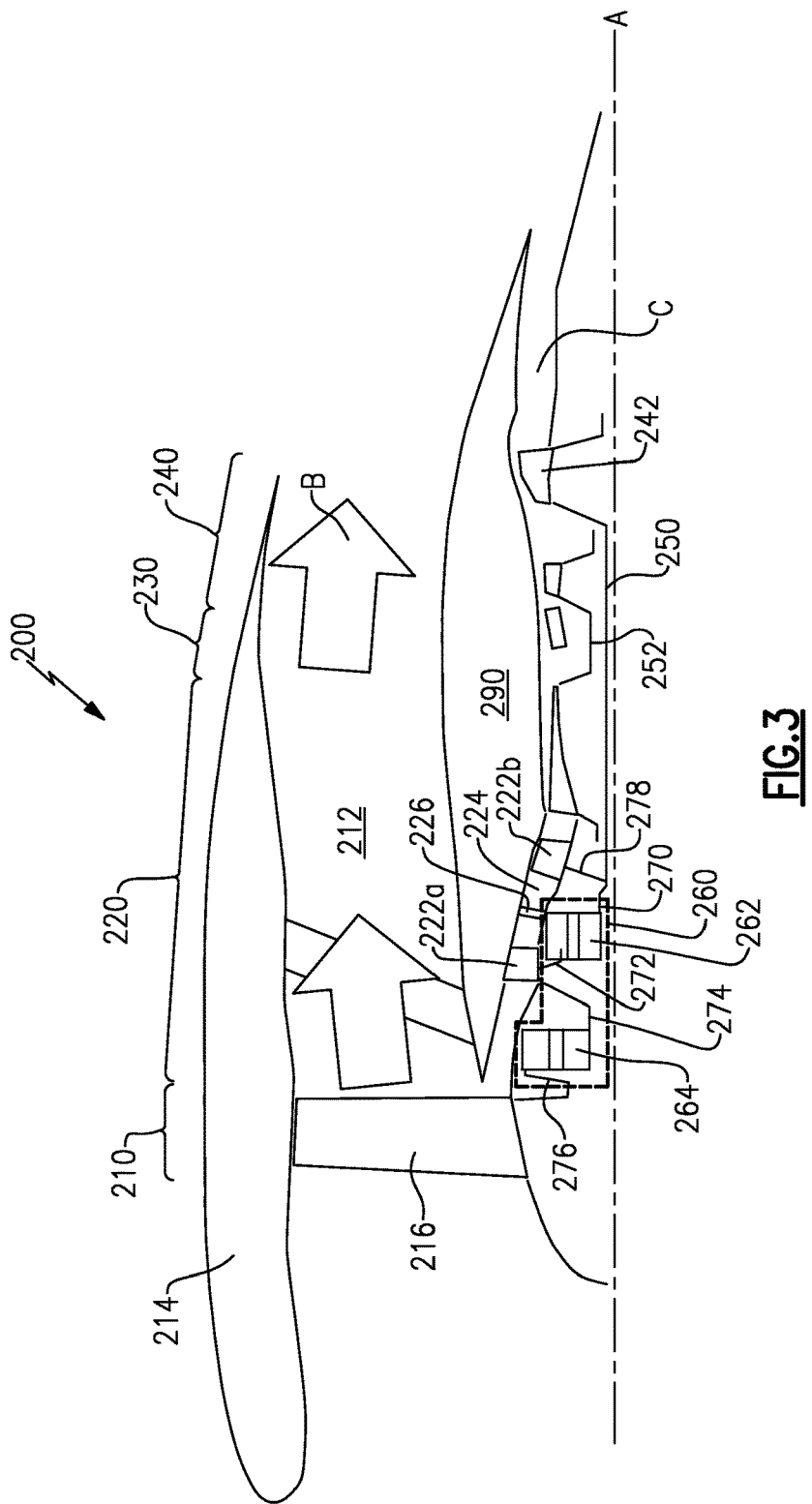
FIG. 3 schematically illustrates a second example geared turbofan engine utilizing a split gear.
Figure 4:
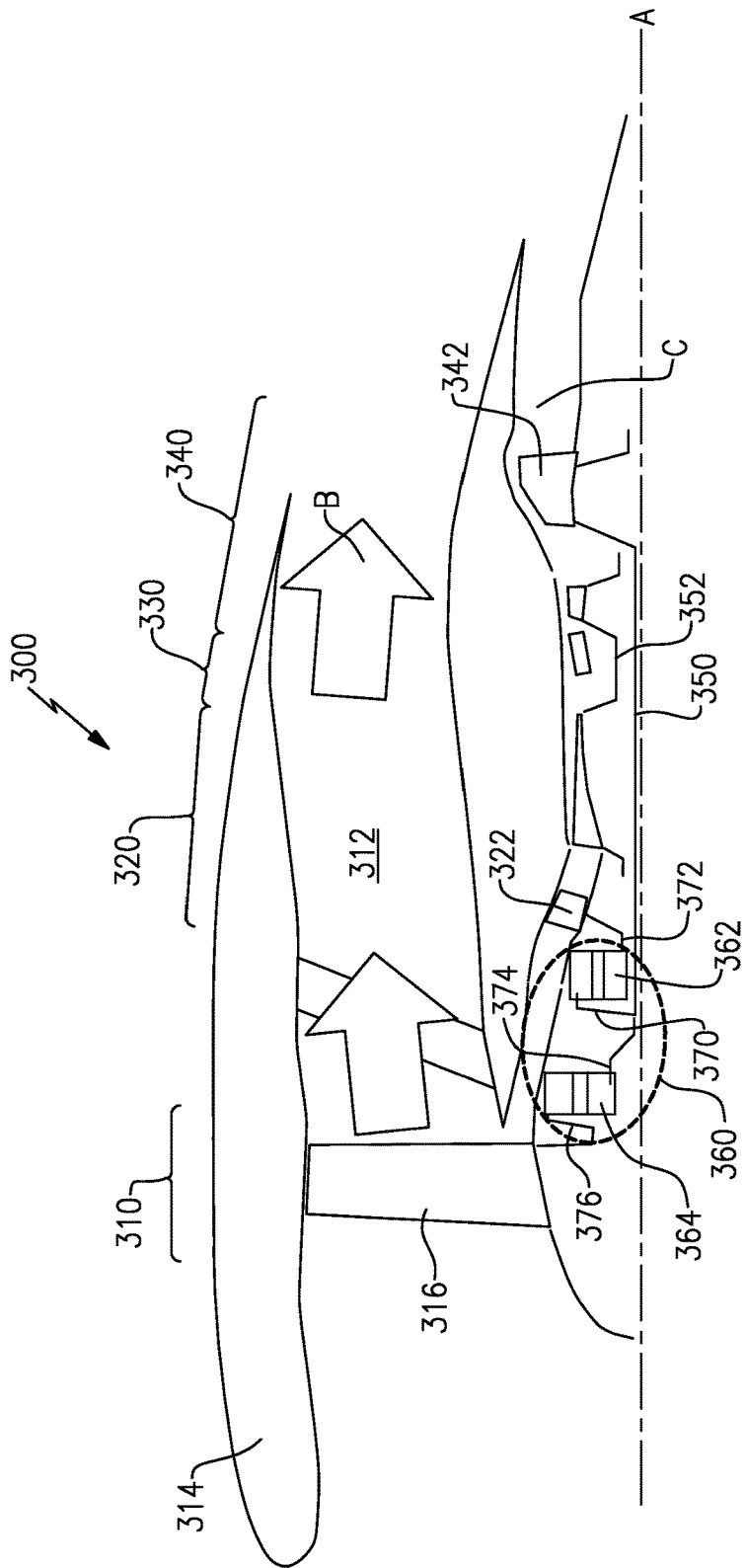
FIG. 4 schematically illustrates a third example geared turbofan engine utilizing a split gear.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. FIGS. 2-4 schematically illustrate exemplary variations of the gear system 48.

The engine 20 in one example is a high-bypass geared aircraft engine. In a further example, the engine 20 bypass ratio is greater than about six (6), with an example embodiment being greater than about ten (10), and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

In some example gas turbine engines, the low pressure turbine 44 rotates at a speed substantially similar to the rotational speed of the high pressure turbine 54. In such an example, a split gear can be utilized as the geared architecture 48. The split gear can utilize an epicyclic gear train, such as a planetary gear system, or any other suitable gear system for each portion of the split gear.

FIG. 2 illustrates a first example gas turbine engine 100 utilizing a split gear 160 as the geared architecture. The gas turbine engine 100 is a two-spool turbofan that generally incorporates a fan section 110, a compressor section 120, a combustor section 130 and a turbine section 140. The fan section 110 drives air along a bypass flow path B in a bypass duct 112 defined within a nacelle 114, while the compressor section 120 drives air along a core flow path C for compression and communication into the combustor section 120 then expansion through the turbine section 140.

The exemplary engine 100 of FIG. 2 includes a low speed spool 150 and a high speed spool 152 mounted for rotation about an engine central longitudinal axis A relative to an engine static structure. The low speed spool 150 generally includes an inner shaft that interconnects a fan 116, a first (or low) pressure compressor 122 and a first (or low) pressure turbine 142. The inner shaft is connected to the fan 116 through a split gear 160 The split gear 160 includes two gear sets 162, 164. The gear sets 162, 164 allow the inner shaft to drive the fan 116 at a lower rotational speed than the rotation of the low speed spool 150.

The low pressure turbine section 142 is a relatively high speed low pressure turbine section, and rotates at a high speed relative to standard low pressure turbine sections. In one example embodiment, the relatively high speed low pressure turbine section 142 includes two or three turbine stages. In previous geared turbofan engines, the fan is driven at a stepped down speed, relative to the low speed spool 150 and the low pressure compressor 122 is driven directly by the low speed spool 150. Due to the increased speed of the relatively high speed turbine 142 in this example, directly driving the low pressure compressor 122 would cause the low pressure compressor 122 to rotate too fast, resulting in undesirable aerodynamic shock losses and speed related structural challenges.

The split gear 160 illustrated in the example of FIG. 2 utilizes a first gear set 162 and a second gear set 164 arranged in series to provide a sequential rotational speed step down. The first gear set 162 receives a rotational input 170 from the low speed spool 150. The first gear set 162 outputs a second rotational speed, lower than the input rotational speed at an output 172. The output 172 is provided to the low pressure compressor section 122 and drives the low pressure compressor 122 to rotate at the output rotational speed. In each gear set 162, 164 the ratio of the output speed to the input speed is referred to as the gear ratio. In some example engines, the first gear set 162 and the second gear set have different gear ratios. In alternative example engines 100, the first gear set 162 and the second gear set 164 can have identical gear ratios.

The output rotation is then provided from the low pressure compressor 122 to the second gear set 164 of the split gear 160 via a rotational input 174. The rotational speed of the rotational input 174 at the second gear set 164 and the rotational speed of the rotational output 172 of the first gear set 162 are the same rotational speed. The second gear set 164 steps down the rotational speed a second time and provides a rotational output 176 that drives rotation of the fan 116.

Due to the arrangement of the split gear 160, the low speed spool 150 drives the low pressure compressor 122 and the fan 116, both of which rotate at a lower speed than the relatively high speed turbine 142, and both of which operate at different speeds.

With continued reference to FIG. 2, and with like numerals indicating like elements, FIG. 3 illustrates a second example gas turbine engine 200 utilizing a split gear 260. As with the example of FIG. 2, the gas turbine engine 200 is a two-spool turbofan that generally incorporates a fan section 210, a compressor section 220, a combustor section 230 and a turbine section 240. The fan section 210 drives air along a bypass flow path B in a bypass duct 212 defined within a nacelle 214, while the compressor section 220 drives air along a core flow path C for compression and communication into the combustor section 230 then expansion through the turbine section 240.

The exemplary engine 200 includes a low speed spool 250 and a high speed spool 252 mounted for rotation about an engine central longitudinal axis A relative to an engine static structure. The low speed spool 250 includes an inner shaft that interconnects a fan 216, a first (or low) pressure compressor 222 and a first (or low) pressure turbine 242. The inner shaft is connected to the fan 216 through a split gear 260. The split gear 260 includes two speed gear sets 262, 264. The gear sets 262, 264 allow the inner shaft to drive the fan 216 and a portion of the low pressure compressor 222 at a lower rotational speed than the rotation of the low speed spool 230.

The gas turbine engine 200 in the example of FIG. 3 is differentiated from the gas turbine engine 100 of FIG. 2, in that the low pressure compressor section 222 of FIG. 3 is split into a low speed low pressure compressor portion 222a and a high speed low pressure compressor portion 222b. Depending on the number of stages and combined pressure ratio in the low pressure compressor 222, it may be desirable to have the forward airfoils rotating at one speed, and the aft airfoils rotating at a higher speed to compensate for temperature related relative velocity effects. A transition duct 224 transmits compressed air from the low speed low pressure compressor portion 222a to the high speed low pressure compressor portion 222b. In some examples, a static support structure 226 is disposed within the transition duct 224 and provides structural support to an outer case 290 of the gas turbine engine 200. In alternate examples, the static support structure 226 can be omitted.

As with the example of FIG. 2, the split gear 260 illustrated in the example of FIG. 3 utilizes a first gear set 262 and a second gear set 264 arranged in series to provide a sequential rotational speed step down. The first gear set 262 receives a rotational input 270 from the low speed spool 250. The first gear set 262 outputs a second rotational speed, lower than the input rotational speed at an output 272. The output 272 is provided to the low speed low pressure compressor portion 222a and drives the low speed low pressure compressor portion 222a to rotate at the output rotational speed.

The output rotational speed is then provided from the low speed low pressure compressor portion 222a to the second gear set 264 of the split gear 260 via a rotational input 274. The rotational speed of the rotational input 274 at the second gear set 264 and the rotational speed of the rotational output 272 of the first gear set 272 are the same rotational speed. The second gear set 264 steps down the rotational speed a second time and provides a rotational output 276 that drives rotation of the fan 216.

Referring now to the exemplary gas turbine engines 100, 200 of FIGS. 2 and 3, the utilization of the split gear 160, 260 facilitates the incorporation of a relatively high speed low pressure turbine section 142 to enable the fan 216 and the low pressure compressor 222 to operate in desirable speed domains. In alternative examples, however, it can be desirable to utilize a relatively low speed low pressure turbine section in the engine.

With continued reference to FIGS. 2 and 3, and with like numerals indicating like elements, FIG. 4 illustrates one such engine 300, utilizing a lower speed low pressure turbine portion 342. As with the examples of FIGS. 2 and 3, the gas turbine engine 300 is a two-spool turbofan that generally incorporates a fan section 310, a compressor section 320, a combustor section 330 and a turbine section 340. The fan section 310 drives air along a bypass flow path B in a bypass duct 312 defined within a nacelle 314, while the compressor section 320 drives air along a core flow path C for compression and communication into the combustor section 320 then expansion through the turbine section 340.

The exemplary engine 300 includes a low speed spool 350 and a high speed spool 352 mounted for rotation about an engine central longitudinal axis A relative to an engine static structure. The low speed spool 350 includes an inner shaft that interconnects a fan 316, a first (or low) pressure compressor 322 and a first (or low) pressure turbine 342. The inner shaft is connected to the fan 316 through a split gear 360. The split gear 360 includes two gear sets 362, 364, and allows the inner shaft to drive the fan 316 at a lower rotational speed than the rotation of the low speed spool 330. In one example, the low pressure turbine 342 of the engine 300 illustrated in FIG. 4 includes three, four, or five stages. In an alternative example, the low pressure turbine 342 can include more than five stages.

In the example of FIG. 4, the gear sets 362, 364 are arranged in parallel with the first gear set 363 being a step up gear that increases the rotational speed provided to the low pressure compressor 322, and the second gear set 364 being a step down gear that decreases the rotational speed provided to the fan 316. The first gear set 362 receives an input 370 directly from the low speed spool 350. Similarly, the second gear set 364 also receives an input 374 directly from the low speed spool 350. Both the inputs 370, 374 to the gear sets 362, 364 rotate at the same rotational speed.

An output 372 of the first gear set 362 rotates at a higher rotational speed than the input 370 of the first gear set 362. The output 372 is connected to the low pressure compressor 322 and drives the low pressure compressor to rotate at the higher speed.

An output 376 of the second gear set 364 rotates at a lower rotational speed than the input 374 of the second gear set 364. The output 376 is connected to the fan 316 and drives the fan 316 to rotate at a lower rotational speed than the input 374.

Although depicted throughout the above disclosure as a two-spool turbofan gas turbine engine in the disclosed non-limiting embodiments of FIGS. 1-4, it should be understood that the concepts described herein are not limited to use with two-spool turbofans as the teachings may be applied to other types of turbine engines including three-spool and possible open-rotor architectures.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan section including a fan;
a compressor section aft of the fan section, and including at least a first compressor and a second compressor, wherein the first compressor is at a low pressure relative to the second compressor, and wherein the first compressor comprises a low speed compressor portion and a high speed compressor portion;
a combustor fluidly connected to the compressor section;
a turbine section fluidly connected to the combustor, wherein the turbine section includes at least a first turbine and a second turbine, wherein the second turbine operates at a higher pressure than the first turbine;
a shaft connected to the first turbine section such that the first turbine is operable to drive rotation of the shaft and directly connected to the high speed compressor portion and configured to directly drive the high speed compressor portion;
wherein the shaft is a rotational input for a split gear, the split gear including at least a first gear set having a first gear set rotational input and a first gear set rotational output and a second gear set having a second gear set rotational input and a second gear set rotational output, and wherein said first gear set rotational output and said second gear set rotational output are split gear outputs;
wherein said split gear is connected to said fan and at least one of said multiple compressors such that a first output of said split gear drives said fan and a second output of said split gear drives said at least one of said multiple compressors; and
wherein the first gear set rotational output is connected to the low speed compressor portion, such that the rotational output of the first gear set is operable to drive rotation of the low speed compressor portion, and the first gear set rotational input is connected to the shaft, such that the first gear set is driven by the shaft;

wherein the second gear set rotational input is connected to the low speed compressor portion such that rotation of the low speed compressor portion drives rotation of the second gear set; and wherein the second gear set rotational output is connected to said fan, such that the rotational output of the second gear set is operable to drive rotation of the fan.

2. The gas turbine engine of claim 1, wherein a fluid output of the low speed compressor portion is fluidly connected to a fluid input of the high speed compressor portion via a transition duct.

3. The gas turbine engine of claim 2, further comprising at least one static structural support disposed in said transition duct, wherein the static structural support supports an outer case of the gas turbine engine.

4. The gas turbine engine of claim 2, wherein the first turbine section includes a number of stages in the range of 3 to 5 stages.

* * * * *